US012764187B2

(12) United States Patent
Tong et al.

(10) Patent No.: US 12,764,187 B2
(45) Date of Patent: Oct. 13, 2026

(54) REMOTE DIRECT MEMORY ACCESS DATA REPLICATION MODEL

(71) Applicant: Microsoft Technology Licensing, LLC, Redmond, WA (US)

(72) Inventors: Yingrui Tong, Shanghai (CN); Sijia Huang, Shanghai (CN); Vadim Makhervaks, Bellevue, WA (US); Madhav Himanshubhai Pandya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 18/587,247

(22) Filed: Feb. 26, 2024

(65) Prior Publication Data

US 2025/0159043 A1 May 15, 2025

Related U.S. Application Data

(60) Provisional application No. 63/598,420, filed on Nov. 13, 2023.

(51) Int. Cl.
*G06F 15/16* (2006.01)
*G06F 11/34* (2006.01)
*H04L 67/1097* (2022.01)

(52) U.S. Cl.
CPC ...... *H04L 67/1097* (2013.01); *G06F 11/3476* (2013.01)

(58) Field of Classification Search
CPC .. H04L 67/1097; H04L 67/1095; H04L 29/06
See application file for complete search history.

(56) References Cited

U.S. PATENT DOCUMENTS 9,881,014 B1 1/2018 Bono
10,831,684 B1 11/2020 Kamran
11,086,524 B1 8/2021 Sun
11,409,454 B1 8/2022 Shveidel
11,520,516 B1 12/2022 Jayaraman
(Continued)

OTHER PUBLICATIONS

"Notification Port Example", Retrieved From: https://learn.microsoft.com/en-us/previous-versions/windows/desktop/mscs/notification-port-example, May 31, 2018, 4 Pages.
(Continued)

*Primary Examiner* — Yves Dalencourt
(74) *Attorney, Agent, or Firm* — Workman Nydegger

(57) ABSTRACT

A computer-implemented method for replicating a log to a remote computer system is disclosed. The method involves identifying a log comprising a data portion and a metadata portion for replication. The data portion is sent to the remote computer system using a Remote Direct Memory Access (RDMA) write operation, while the metadata portion is sent using a first RDMA send operation after the data portion has been sent. The method further includes identifying a second RDMA send operation received from the remote computer system, which indicates the completion of the first RDMA send operation. Based on identifying the second RDMA send operation, the method determines the completion of log replication to the remote computer system. This method enables efficient and reliable replication of logs in a computer system.

20 Claims, 4 Drawing Sheets

(56) References Cited

U.S. PATENT DOCUMENTS

| | | | | |
|---|---|---|---|---|
| 11,886,427 | B1 | 1/2024 | Shveidel | |
| 12,117,938 | B1 | 10/2024 | Derzhavetz | |
| 12,182,421 | B1 | 12/2024 | Vankamamidi | |
| 12,204,457 | B1 | 1/2025 | Vankamamidi | |
| 12,271,625 | B1 * | 4/2025 | Astolfi | G06F 3/0656 |
| 2009/0138625 | A1 | 5/2009 | Lee et al. | |
| 2012/0054381 | A1 * | 3/2012 | Craddock | G06F 13/28 710/28 |
| 2012/0124294 | A1 | 5/2012 | Atkisson et al. | |
| 2012/0278511 | A1 * | 11/2012 | Alatorre | G06F 3/0605 710/33 |
| 2016/0011929 | A1 | 1/2016 | Caradonna | |
| 2016/0092118 | A1 | 3/2016 | Kumar | |
| 2016/0306580 | A1 | 10/2016 | Pinto | |
| 2017/0052723 | A1 * | 2/2017 | Voigt | G06F 9/06 |
| 2017/0308298 | A1 | 10/2017 | Vyshetsky | |
| 2018/0150397 | A1 | 5/2018 | Gupta | |
| 2018/0316760 | A1 * | 11/2018 | Chernin | G06F 3/067 |
| 2019/0317906 | A1 | 10/2019 | Adavi | |
| 2020/0034475 | A1 | 1/2020 | Venkatesan | |
| 2020/0097419 | A1 | 3/2020 | Xing | |
| 2020/0379925 | A1 | 12/2020 | Andrus | |
| 2020/0409583 | A1 | 12/2020 | Kusters | |
| 2021/0117333 | A1 | 4/2021 | Qureshi | |
| 2021/0216459 | A1 * | 7/2021 | Benhanokh | G06F 13/1663 |
| 2022/0019362 | A1 | 1/2022 | Badiger | |
| 2022/0138220 | A1 | 5/2022 | Ahmad | |
| 2023/0013913 | A1 | 1/2023 | Zinger | |
| 2023/0185822 | A1 | 6/2023 | Lee | |
| 2023/0195697 | A1 | 6/2023 | Victor | |
| 2023/0195751 | A1 | 6/2023 | Sun | |
| 2023/0333777 | A1 | 10/2023 | Shveidel | |
| 2023/0342087 | A1 | 10/2023 | He | |
| 2023/0409599 | A1 | 12/2023 | Xu | |
| 2024/0020140 | A1 | 1/2024 | Furman | |
| 2024/0028580 | A1 | 1/2024 | Zhang | |
| 2024/0106754 | A1 | 3/2024 | Meng | |
| 2024/0232020 | A1 | 7/2024 | Shveidel | |
| 2024/0256190 | A1 | 8/2024 | Shveidel | |
| 2025/0103490 | A1 | 3/2025 | Seibel | |
| 2025/0156104 | A1 | 5/2025 | Wang | |
| 2025/0156322 | A1 | 5/2025 | Tong | |
| 2025/0156333 | A1 | 5/2025 | Wang | |
| 2025/0156353 | A1 | 5/2025 | Jin | |
| 2025/0156360 | A1 | 5/2025 | Jin | |

OTHER PUBLICATIONS

"Receiving Cluster Events", Retrieved From: https://learn.microsoft.com/en-us/previous-versions/windows/desktop/mscs/receiving-cluster-events, May 31, 2018, 1 Page.
Notice of Allowance mailed on Apr. 8, 2025, in U.S. Appl. No. 18/594,982 (MS# 413915-US01), 09 pages.
Notice of Allowance mailed on Mar. 26, 2025, in U.S. Appl. No. 18/595,061 (MS# 413916-US01), 09 pages.
Gugnani, et al., "Arcadia: A Fast and Reliable Persistent Memory Replicated Log", arXiv:2206.12495v1, Jun. 24, 2022, pp. 1-14.
International Search Report and Written Opinion received for PCT Application No. PCT/US2024/051682, (MS#413653-PCT01) Feb. 11, 2025, 14 pages.
International Search Report and Written Opinion received for PCT Application No. PCT/US2024/052172 (MS#413654-PCT01), Jan. 29, 2025, 14 Pages.
Lee, et al., "X-SSD: A Storage System with Native Support for Database Logging and Replication", IEEE, Computer Society Press, Jun. 12, 2022, pp. 988-1002.
Ruan, et al., "Persistent Memory Disaggregation for Cloud-Native Relational Databases", International conference on Automotive User Interfaces and Interactive Vehicular Applications, Mar. 25, 2023, pp. 498-512.
Yang, et al., "Orion: A Distributed File System for Non-Volatile Main Memories and RDMA-Capable Networks", Feb. 26, 2019, pp. 221-234.
Non-Final Office Action mailed on Jun. 30, 2025, in U.S. Appl. No. 18/592,026 (#MS 413656-US02), 15 pages.
Notice of Allowance mailed on Jun. 18, 2025, in U.S. Appl. No. 18/595,061 (MS# 413916-US01), 08 pages.
Notice of Allowance mailed on Jun. 23, 2025, in U.S. Appl. No. 18/594,982 (MS# 413915-US01), 10 pages.
Non-Final Office Action mailed on Aug. 8, 2025, in U.S. Appl. No. 18/592,046, (MS# 413655-US02) 16 pages.
Notice of Allowability mailed on Sep. 2, 2025, in U.S. Appl. No. 18/595,061 (MS# 413916-US01), 05 pages.
Notice of Allowance mailed on Aug. 12, 2025, in U.S. Appl. No. 18/594,982 (MS#413915-US01), 10 pages.
Notice of Allowance mailed on Aug. 22, 2025, in U.S. Appl. No. 18/595,061 (MS# 413916-US01), 08 pages.
Notice of Allowance mailed on Sep. 16, 2025, in U.S. Appl. No. 18/594,982 (MS#413915-US01), 10 pages.
Notice of Allowance mailed on Sep. 30, 2025, in U.S. Appl. No. 18/592,026 (MS# 413656-US02), 7 Pages.
Notice of Allowance mailed on Dec. 9, 2025, in U.S. Appl. No. 18/592,046, (MS#413655-US02) 07 pages.
International Preliminary Report on Patentability (Chapter I) received for PCT Application No. PCT/US2024/051682, mailed on May 28, 2026, 09 pages.
International Preliminary Report on Patentability (Chapter I) received for PCT Application No. PCT/US2024/052172, mailed on May 28, 2026, 09 Pages.
U.S. Appl. No. 63/598,420, filed Nov. 13, 2023.
U.S. Appl. No. 63/598,426, filed Nov. 13, 2023.
U.S. Appl. No. 63/598,429, filed Nov. 13, 2023.
U.S. Appl. No. 63/598,438, filed Nov. 13, 2023.
U.S. Appl. No. 18/594,982, filed Mar. 4, 2024.
U.S. Appl. No. 18/595,061, filed Mar. 4, 2024.
U.S. Appl. No. 18/587,258, filed Feb. 26, 2024.
U.S. Appl. No. 18/592,046, filed Feb. 29, 2024.
U.S. Appl. No. 18/592,026, filed Feb. 29, 2024.
U.S. Appl. No. 19/385,793, filed Nov. 11, 2025.
U.S. Appl. No. 19/545,619, filed Feb. 20, 2026.
Non-Final Office Action mailed on Jun. 23, 2026, in U.S. Appl. No. 18/587,258, 16 pages.

* cited by examiner

300

REMOTE DIRECT MEMORY ACCESS DATA REPLICATION MODEL

CROSS-REFERENCE TO RELATED APPLICATIONS

This application claims priority to, and the benefit of, U.S. Provisional Application Ser. No. 63/598,420, filed Nov. 13, 2023, and entitled "REMOTE DIRECT MEMORY ACCESS DATA REPLICATION MODEL," the entire contents of which are incorporated by reference herein in their entirety.

BACKGROUND

Cloud computing has revolutionized the way data is stored and accessed, providing scalable, flexible, and cost-effective solutions for businesses and individuals alike. A core component of these systems is the concept of virtualization, which allows for the creation of virtual machines (VMs) or containers that can utilize resources abstracted from the physical hardware. VMs and containers utilize storage resources, typically in the form of virtual disks. Oftentimes, virtual disks are not tied to any specific physical storage device, but rather, they are abstracted representations of storage space that can be dynamically allocated and adjusted based on the requirements of each VM or container. This abstraction allows for greater flexibility and scalability, as storage resources can be allocated and adjusted dynamically based on the requirements of the VM or container.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including: identifying a log for replication to a remote computer system, the log including a data portion and a metadata portion; sending the data portion to the remote computer system using a Remote Direct Memory Access (RDMA) write operation; sending the metadata portion to the remote computer system using a first RDMA send operation after sending the data portion to the remote computer system using the RDMA write operation; identifying a second RDMA send operation received from the remote computer system, the second RDMA send operation signaling completion of the first RDMA send operation; and determining a completion of replication of the log to the remote computer system based on identifying the second RDMA send operation.

In some aspects, the techniques described herein relate to methods, systems, and computer program products, including: receiving an RDMA write operation from a remote computer system, the RDMA write operation including a data portion of a log; storing the data portion of the log in a memory without use of the processor system; receiving a first RDMA send operation from the remote computer system, the first RDMA send operation including a metadata portion of the log; storing the metadata portion of the log in the memory with use of the processor system; and sending a second RDMA send operation to the remote computer system after storing the metadata portion of the log in the memory.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Figure 1:
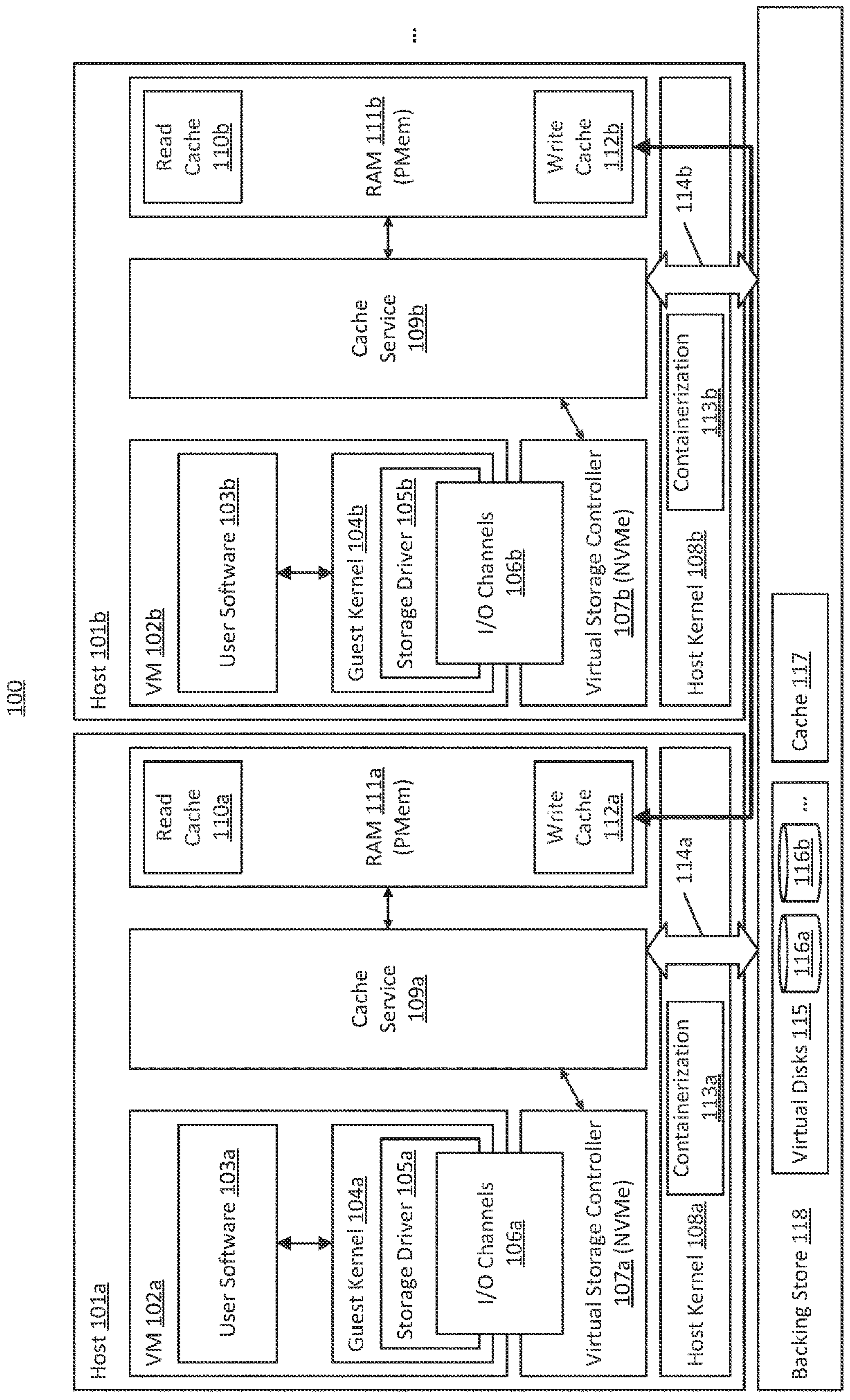
FIG. 1 illustrates an example of a computer architecture that includes a host cache service operating within a cloud environment.

The performance of cloud environments is closely tied to the performance of storage Input/Output (I/O) operations within those environments. For example, the performance of a virtual machine (VM) or container can be impacted greatly by the performance of storage I/O operations used by the VM or container to access (e.g., read from or write to) a virtual disk. Some embodiments described herein are operable within the context of a host cache (e.g., a cache service operating at a VM/container host) that improves the performance of I/O operations of a hosted VM or container for accessing a virtual disk.

In some embodiments, a host cache utilizes persistent memory (PMem) and Non-Volatile Memory Express (NVMe) technologies to improve storage I/O performance within a cloud environment. PMem refers to non-volatile memory technologies (e.g., INTEL OPTANE, SAMSUNG Z-NAND) that retain their stored contents through power cycles. This contrasts with conventional volatile memory technologies such as dynamic random-access memory (DRAM) that lose their stored contents through power cycles. Some PMem technology is available as non-volatile media that fits in a computer's standard memory slot (e.g., Dual Inline Memory Module, or DIMM, memory slot) and is thus addressable as random-access memory (RAM).

NVMe refers to a type of non-volatile block storage technology that uses the Peripheral Component Interconnect Express (PCIe) bus and is designed to leverage the capabilities of high-speed storage devices like solid-state drives (SSDs), providing faster data transfer rates compared to traditional storage interfaces (e.g., Serial AT Attachment (SATA)). NVMe devices are particularly beneficial in dataintensive applications due to their low latency I/O and high I/O throughput compared to SATA devices. NVMe devices can also support multiple I/O queues, which further enhance their performance capabilities.

Currently, PMem devices have slower I/O access times than DRAM, but they provide higher I/O throughput than SSD and NVMe. Compared to DRAM, PMem modules come in much larger capacities and are less expensive per gigabyte (GB), but they are more expensive per GB than NVMe. Thus, PMem is often positioned as lower-capacity "top-tier" high-performance non-volatile storage that can be backed in a "lower-tier" by larger-capacity NVMe drives, SSDs, and the like. As a result, PMem is sometimes referred to as "storage-class memory."

In embodiments, a host cache improves the performance of storage I/O operations of VMs and/or containers to their virtual disks by utilizing NVMe protocols. For example, some embodiments use a virtual NVMe controller to expose virtual disks to VMs and/or containers, enabling those VMs/containers to utilize NVMe queues, buffers, control registers, etc., directly. Additionally, or alternatively, a host cache improves the performance of storage I/O operations of VMs and/or containers to their virtual disks by leveraging PMem as high-performance non-volatile storage for caching reads and/or writes.

In traditional networking methods, data transfer between computers typically involves multiple data copies and context switches, which can significantly increase latency and CPU overhead. For example, when data is sent over a network, it is usually copied from the sending application's memory to the operating system kernel memory, then to the network protocol stack, and finally to the network interface card (NIC). Upon reaching the destination, the data is copied in reverse order from the NIC to the destination application's memory. This process is not only time-consuming but also burdens the CPU, which could otherwise be used for processing the actual data.

To address these inefficiencies, Remote Direct Memory Access (RDMA) was developed to enable more direct data transfers. RDMA-capable NICs, often referred to as RDMA Network Interface Cards (RNICs), allow applications on different computers to transfer data directly between their memory spaces without the need for significant CPU intervention. This is achieved by establishing a connection and pre-registering the memory regions involved in the transfer, which allows the RNICs to access the memory directly using Direct Memory Access (DMA) operations.

Some embodiments described herein utilize RDMA technology to replicate write cache logs from one host to another. RDMA technology allows data to be transferred directly from the memory of one computer to the memory of another computer with little or no involvement of the CPU or OS of the remote system. This direct memory-to-memory data transfer can improve throughput and performance while reducing latency, making it particularly useful in high-performance computing and data center environments.

FIG. 1 illustrates an example of a host cache service operating within a cloud environment 100. In FIG. 1, cloud environment 100 includes hosts (e.g., host 101*a*, host 101*b*; collectively, hosts 101). An ellipsis to the right of host 101*b* indicates that hosts 101 can include any number of hosts (e.g., one or more hosts). In embodiments, each host is a VM host and/or a container host. Cloud environment 100 also includes a backing store 118 (or a plurality of backing stores) storing, e.g., virtual disks 115 (e.g., virtual disk 116*a*, virtual disk 116*b*) for use by VMs/containers operating at hosts 101, de-staged cache data (e.g., cache 117), etc.

In the example of FIG. 1, each host of hosts 101 includes a corresponding host operating system (OS) including a corresponding host kernel (e.g., host kernel 108*a*, host kernel 108*b*) that each includes (or interoperates with) a containerization component (e.g., containerization component 113*a*, containerization component 113*b*) that supports the creation of one or more VMs and/or one or more containers at the host. Examples of containerization components include a hypervisor (or elements of a hypervisor stack) and a containerization engine (e.g., AZURE container services, DOCKER, LINUX Containers). In FIG. 1, each host of hosts 101 includes a VM (e.g., VM 102*a*, VM 102*b*). VM 102*a* and VM 102*b* are each shown as including a guest kernel (e.g., guest kernel 104*a*, guest kernel 104*b*) and user software (e.g., user software 103*a*, user software 103*b*).

In FIG. 1, each host of hosts 101 includes a host cache service (e.g., cache service 109*a*, cache service 109*b*). In embodiments, a storage driver (e.g., storage driver 105*a*, storage driver 105*b*) at each VM/container interacts, via one or more I/O channels (e.g., I/O channels 106*a*, I/O channels 106*b*) with a virtual storage controller (e.g., virtual storage controller 107*a*, virtual storage controller 107*b*) for its I/O operations, such as I/O operations for accessing virtual disks 115. In embodiments, each host cache service communicates with a virtual storage controller to cache these I/O operations. As one example, in FIG. 1, the virtual storage controllers are shown as being virtual NVMe controllers. In this example, the I/O channels comprise NVMe queues (e.g., administrative queues, submission queues, completion queues), buffers, control registers, and the like.

In embodiments, each host cache service at least temporarily caches reads (e.g., read cache 110*a*, read cache 110*b*) and/or writes (e.g., write cache 112*a*, write cache 112*b*) in memory (e.g., RAM 111*a*, RAM 111*b*). As shown, in some embodiments, memory includes non-volatile PMem. For example, a read cache stores data that has been read (and/or that is predicted to be read) by VMs from backing store 118 (e.g., virtual disks 115), which can improve read I/O performance for those VMs (e.g., by serving reads from the read cache if that data is read more than once). A write cache, on the other hand, stores data that has been written by VMs to virtual disks 115 prior to persisting that data to backing store 118. Write caching allows for faster write operations, as the data can be written to the write cache quickly and then be written to the backing store 118 at a later time (e.g., when the backing store 118 is less busy).

In embodiments, and as indicated by arrow 114*a* and arrow 114*b*, each host cache service may persist (e.g., de-stage) cached writes from memory to backing store 118 (e.g., to virtual disks 115 and/or to cache 117). In addition, an arrow that connects write cache 112*a* and write cache 112*b* indicates that, in some embodiments, the host cache service replicates cached writes from one host to another (e.g., from host 101*a* to host 101*b*, or vice versa).

In embodiments, each write cache (write cache 112*a*, write cache 112*b*) is a write-ahead log that is stored as one or more ring buffers in memory (e.g., RAM 111*a*, RAM 111*b*). Write-ahead logging (WAL) refers to techniques for providing atomicity and durability in database systems. Write-ahead logs generally include append-only data structures that are used for crash and transaction recovery. With WAL, changes are first recorded as a log entry in a log (e.g., write cache 112*a*, write cache 112*b*) and are then written to stable storage (e.g., backing store 118) before the changes are considered committed. A ring buffer is a data structure that uses a single, fixed-size buffer as if connected end-toend. That is, once the size of the buffer is exceeded, a new buffer replaces the oldest buffer entry.

In embodiments, for each write request from a VM, the host cache service stores a log entry comprising 1) a data portion comprising the data that was written by the VM as part of the write request (e.g., one or more memory pages to be persisted to virtual disks 115), and 2) a metadata portion describing the log entry and the write—e.g., a log identifier, a logical block address (LBA) for the memory page(s) in the data portion, and the like. In embodiments, data portions have a size that aligns cleanly in memory, including in a central processing unit (CPU) cache. For example, if a data portion represents n memory page(s), then the data portion is sized as a multiple of the size of each memory page in RAM 111*a*, RAM 111*b* (e.g., a multiple of four kilobytes (KB), a multiple of sixteen KB). If the metadata portion of each log is stored adjacent to its data portion in memory, then this memory alignment is broken. For instance, if the data portion of a log is n memory pages, and the metadata portion of that log is 32 bytes, then that log would require the entirety of n memory pages plus 32 bytes of a final memory page, which wastes most of the final memory page. Additionally, logs sized as n memory pages plus metadata would not fit cleanly across CPU cache lines, eliminating the ability to apply bitwise operations (e.g., for address searching).

In some embodiments, a host cache service utilizes separate ring buffers for data and metadata, which enables the host cache service to maintain clean memory alignments when storing write cache logs. A clean memory alignment refers to arranging data in memory so that it is aligned to certain boundaries, such as memory page sizes, cache line sizes, etc. Maintaining a clean memory alignment can improve memory access performance because aligned data maps to cache line sizes, improving cache hit rates; because an aligned memory access is generally faster for a processor to complete than a non-aligned memory access; and/or because an aligned memory access can avoid some processor exceptions that may otherwise occur with a non-aligned memory access.

Figure 2:
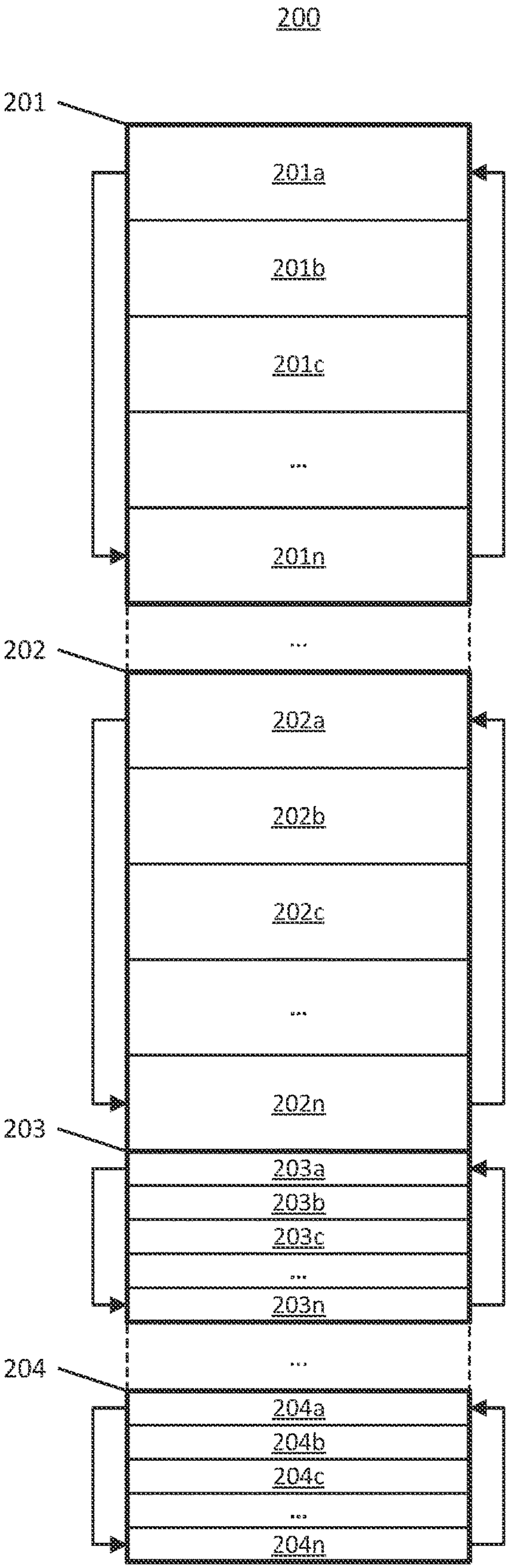
FIG. 2 illustrates an example of storing multiple data and metadata rings within a memory.

FIG. 2 illustrates an example 200 of storing multiple data and metadata rings within a memory. In example 200, memory is shown as storing a data ring 201 and a data ring 202, each comprising a plurality of entries (e.g., entry 201*a* to entry 201*n* for data ring 201 and entry 202*a* to entry 202*n* for data ring 202). Arrows indicate that entries are used circularly within each data ring, and an ellipsis within each data ring indicates that a data ring can comprise any number of entries. As indicated by an ellipsis between data ring 201 and data ring 202, in embodiments, a memory can store any number of data rings (e.g., one or more data rings). In some embodiments, multiple data rings are stored contiguously within the memory (e.g., one after the other).

In example 200, the memory is shown as also storing a metadata ring 203 and a metadata ring 204, each comprising a plurality of entries (e.g., entry 203*a* to entry 203*n* for metadata ring 203 and entry 204*a* to entry 204*n* for metadata ring 204). Arrows indicate that entries are used circularly within each metadata ring, and an ellipsis within each metadata ring indicates that a metadata ring can comprise any number of entries. As indicated by an ellipsis between metadata ring 203 and metadata ring 204, in embodiments, a memory can store any number of metadata rings (e.g., one or more metadata rings). In some embodiments, multiple metadata rings are stored contiguously within the memory. Thus, in these embodiments, multiple metadata rings are stored one after the other within the memory. In some embodiments, a block of data rings and a block of metadata rings are stored contiguously with each other within the memory (e.g., contiguous data rings, then contiguous metadata rings).

In embodiments, each metadata ring corresponds to a different data ring. For example, in example 200, metadata ring 203 corresponds to data ring 201, and metadata ring 204 corresponds to data ring 202. In embodiments, each entry in a metadata ring corresponds to a corresponding entry in a data ring (and vice versa). For example, entries 203*a*-203*n* correspond to entries 201*a*-201*n*, respectively, and entries 204*a*-204*n* correspond to entries 202*a*-202*n*, respectively.

In some embodiments, each pairing of data and metadata rings corresponds to a different entity, such as a VM or container, for which data is cached. This enables the data cached for each entity to be separated and localized within memory.

In embodiments, by storing data and metadata in separate rings, as shown in example 200, a host cache service can ensure that data and metadata are aligned to memory page boundaries, which minimizes (and even eliminates) any wasted memory that would result if data and metadata were stored together. For example, each data ring may be sized to correspond to the size of a memory page, or to a multiple of the memory page size. Additionally, metadata rings may be sized such that a plurality of contiguously stored metadata rings corresponds to the size of a memory page or to a multiple of the memory page size.

Some embodiments replicate write cache logs between hosts, such as replicating one or more logs from write cache 112*a* to write cache 112*b* or vice versa. This replication ensures data reliability and availability. For example, absent replication, if host 101*a* were to go down (e.g., crash, power down) or become unresponsive before persisting a log from write cache 112*a* to backing store 118 (e.g., cache 117), that log could become temporarily unavailable (e.g., until host 101*a* is brought back up or becomes responsive again) or even be lost. Thus, in embodiments, host cache service instances (e.g., cache service 109*a*, cache service 109*b*) cooperate with one another to replicate logs across hosts, ensuring the reliability and availability of those logs before they are persisted to backing store 118.

In embodiments, a host cache service commits a write I/O operation (e.g., acknowledges completion of the write I/O operation to a virtual storage controller, a storage driver, etc.) after replication of that operation's corresponding data has been completed. This means that a write I/O operation can be committed before the data written by the operation has been de-staged to backing store 118 while ensuring the reliability and availability of the data written. In embodiments, committing a write I/O operation prior to that data being written to a backing store shortens the I/O path for the I/O operation, which enables lower latency for write I/O operations than would be possible absent the host cache service described herein.

As mentioned, some embodiments utilize RDMA technology to replicate write cache logs from one host to another. RDMA technology allows data to be transferred directly from the memory of one computer (e.g., host 101*a*) to the memory of another computer (e.g., host 101*b*) with little or no involvement of the CPU or OS of the remote system. This direct memory-to-memory data transfer can improve throughput and performance while reducing latency, making it particularly useful in high-performance computing and data center environments, such as cloud environment 100.

Figure 3:
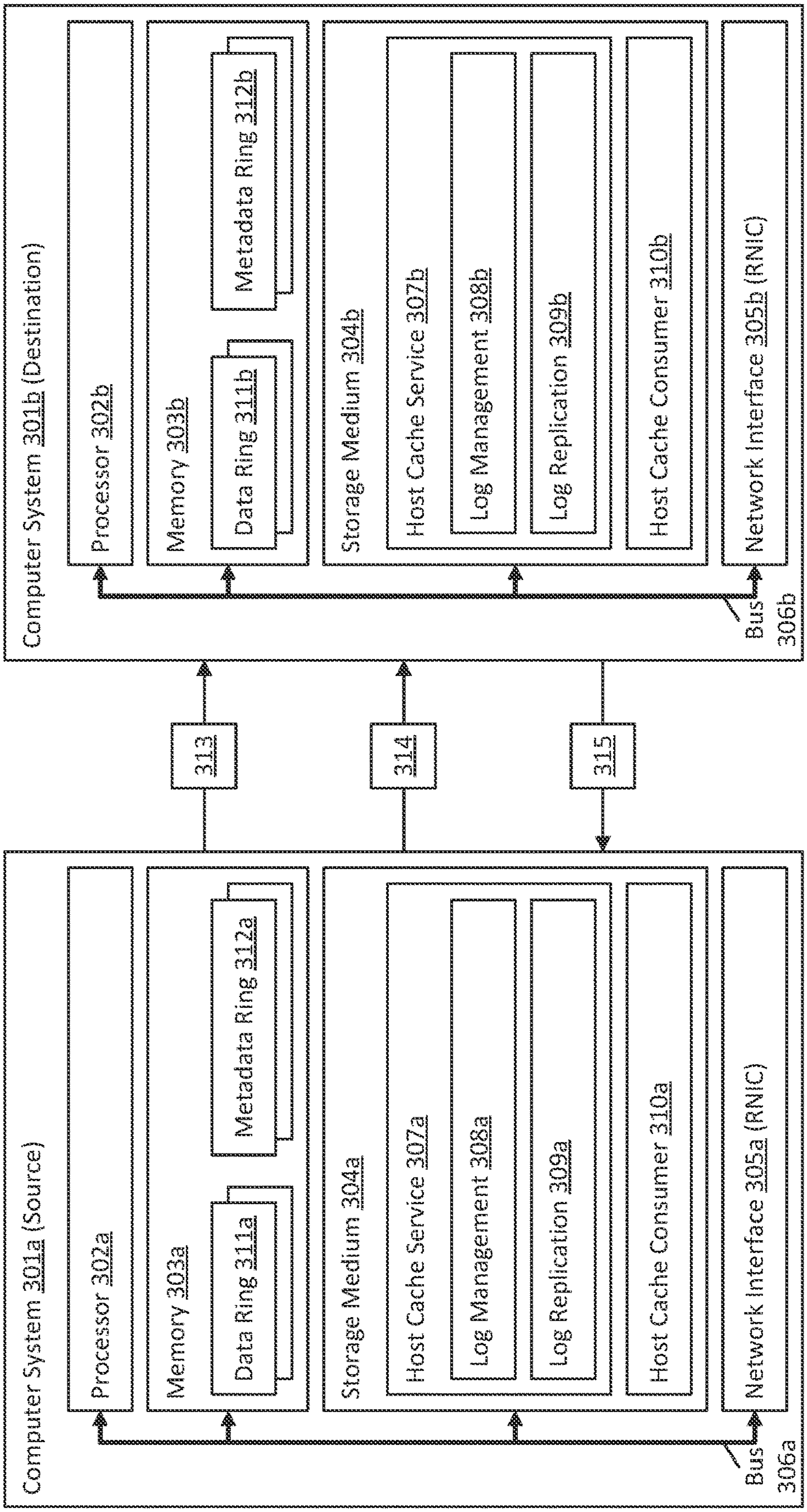
FIG. 3 illustrates an example of a computer architecture that utilizes a Remote Direct Memory Access (RDMA) replication model.

FIG. 3 illustrates an example 300 of a computer architecture that utilizes an RDMA replication model. Example 300 includes a computer system 301*a* acting as a source host and a computer system 301*b* acting as a destination host, both interconnected by a network (not shown). Within the context of cloud environment 100, for example, computer system 301*a* may correspond to host 101*a*, while computer system 301*b* corresponds to cache 110*b*. It is noted, however, that the principles described in connection with example 300 are applicable beyond VM/container hosting environments.

As shown, computer system 301*a*, 301*b* each includes a processor system (processor system 302*a* at computer system 301*a*, processor system 302*b* at host cache consumer 310*b*), a memory (memory 303*a* at computer system 301*a*, memory 303*b* at computer system 301*b*), a storage medium (storage medium 304*a* at computer system 301*a*, storage medium 304*b* at computer system 301*b*), and a network interface (network interface 305*a* at computer system 301*a*, network interface 305*b* at computer system 301*b*), each interconnected by a bus (bus 306*a* at computer system 301*a*, bus 306*b* at computer system 301*b*).

Referring to storage medium 304*a*, example 300 shows that computer system 301*a* includes a host cache service 307*a* (e.g., cache service 109*a*) that includes a log management component 308*a* and a log replication component 309*a*. In embodiments, host cache service 307*a* operates on behalf of a host cache consumer 310*a* (e.g., VM 102*a*, virtual storage controller 107*a*) to cache writes I/O operations initiated by the consumer.

Referring to storage medium 304*b*, example 300 shows that computer system 301*b* also includes a host cache service 307*b* (e.g., cache service 109*b*). In some embodiments, such as the one shown in example 300, host cache service 307*b* includes the same functionality as host cache service 307*a* (e.g., log management component 308*b*, a log replication component 309*b*) and is configured to operate on behalf of a host cache consumer 310*b* (e.g., VM 102*b*, virtual storage controller 107*b*). However, in other embodiments, host cache service 307*b* may operate as a log replication target without actually operating on behalf of any host cache consumer.

As shown in memory 303*a*, log management component 308*a* manages logs that are stored as separated data and metadata, as described in connection with example 200. Thus, in example 300, memory 303*a* is shown as storing a data ring 311*a* and a metadata ring 312*a*. For example, data ring 311*a* may correspond to data ring 201, while metadata ring 312*a* corresponds to metadata ring 203. Thus, for instance, entry 201*a* (data) and entry 203*a* (metadata) make up a single log stored in memory 303*a*. In embodiments, data ring 311*a* and metadata ring 312*a* are stored in a PMem portion of memory 303*a*. As indicated in FIG. 3, log management component 308*a* could manage multiple data and metadata rings.

In example 300, log replication component 309*a* uses RDMA to replicate logs (including their data and their metadata) from memory 303*a* to computer system 301*b*. Thus, memory 303*b* is shown as storing data ring 311*b* and metadata ring 312*b*, and network interface 305*a*, 305*b* are each shown as being RNICs. RDMA supports several operations, including a "write" operation and a "send" operation. The RDMA write operation is used to transfer data from a local memory region (e.g., memory 303*a*; write cache 112*a* within RAM 111*a*, from the perspective of host 101*a*) to a remote memory region (e.g., memory 303*b*; write cache 112*b* within RAM 111*b*, from the perspective of host 101*a*). The RDMA write operation does not involve the CPU at the remote end and is completed when data has been placed into a remote memory region.

The RDMA send operation is used to send data from a local memory region (e.g., a data area of write cache 1121) to a remote memory region (e.g., a data area of write cache 112*b*). Unlike the RDMA write operation, the RDMA send operation involves the remote CPU to move data from a temporary receive buffer at the remote system into the remote system's memory (e.g., a metadata area of write cache 112*b*).

Embodiments utilize the RDMA write and RDMA send operations, combined with separated data and metadata, to provide a novel RDMA replication model that ensures data visibility and crash consistency. In these embodiments, when replicating data (e.g., the data of one or more write cache logs) from a source host (e.g., computer system 301*a*) to a destination (e.g., computer system 301*b*), a host cache service (e.g., host cache service 307*a*) uses an RDMA write operation to replicate the data to the destination host. For example, log replication component 309*a* at computer system 301*a* uses an RDMA write operation 313 to replicate entry 201*a* from data ring 311*a* (e.g., write cache 112*a*) to data ring 311*b* (e.g., write cache 112*b*). This RDMA write operation 313 places the data into the destination host's memory (e.g., memory 303*b*)—which may comprise volatile memory such as DRAM and/or non-volatile memory such as PMem-without involving the destination host's CPU (e.g., processor system 302*b*). When the destination host's CPU is not involved, I/O latency is reduced as compared to techniques, such as traditional networks, that would involve the destination host's CPU. This also means that the data reaches the destination host's memory without the involvement of the destination host's CPU cache hierarchy (e.g., a zero-copy operation), which further reduces I/O latency.

In embodiments, after sending data to the destination host with an RDMA write operation, the source host uses an RDMA send operation to replicate the corresponding metadata to the destination host. For example, log replication component 309*a* at computer system 301*a* uses an RDMA send operation 314 to replicate entry 203*a* (e.g., the metadata corresponding to entry 201*a*) from metadata ring 312*a* (e.g., write cache 112*a*) to metadata ring 312*b* (e.g., write cache 112*b*). Unlike the RDMA write operation, the RDMA send operation requires the involvement of the destination host's CPU.

Using an RDMA write operation to replicate data, followed by using an RDMA send operation to replicate corresponding metadata, has a two-fold benefit. First, processing the RDMA send operation at the destination host ensures that prior written data (e.g., the data previously sent to it using the RDMA write operation) is flushed from the destination host's PCIe cache to memory. Flushing this prior writing data means that the data has been copied from the host's PCIe cache to the host's memory. Due to strict ordering guarantees provided by the RDMA protocol, and due to the RDMA send operation being issued after the RDMA write operation, processing the RDMA send operation guarantees full completion of the prior RDMA write operation at the destination host. Second, processing the RDMA send operation gives the destination host a chance to acknowledge the replication (e.g., acknowledge receipt of an RDMA write and subsequent RDMA send). In embodiments, the destination host acknowledges the replication by sending an RDMA send operation 315 to the source host. In embodiments, this RDMA send operation initiated by the destination host includes relevant information, such as status (e.g., success). When the source host receives this RDMA send initiated by the destination host, the source host can infer that both its RDMA write (data) and RDMA send (metadata) to the destination host have been completed at the destination host.

Thus, an RDMA data replication model that includes sending data with an RDMA write operation, followed by sending metadata with an RDMA send operation, ensures data consistency, e.g., in the event of a crash. More specifically, this RDMA data replication model guarantees that data and its corresponding metadata are both stored in the destination host's memory before the source host commits the I/O operation (e.g., to host cache consumer 310*a*). Additionally, if the data is persisted to non-volatile memory such as PMem at the destination host, then, after a destination host restarts, for any metadata present in the non-volatile memory, there is a guarantee that the corresponding data is also present in the non-volatile memory.

Embodiments are now described in connection with FIG. 4, which illustrates a flow chart of an example method 400 for using an RDMA replication model to replicate a log. As shown, method 400 includes method 400*a* at a source host (e.g., host 101*a*) and method 400*b* performed at a destination host (e.g., host 101*b*). In embodiments, instructions for implementing method 400*a* are encoded as computer-executable instructions (e.g., host cache service 307*a*) stored on a computer storage medium (e.g., storage medium 304*a*) that are executable by a processor (e.g., processor system 302*a*) to cause a source host computer system (e.g., computer system 301*a*) to perform method 400*a*. In embodiments, instructions for implementing method 400*b* are encoded as computer-executable instructions (e.g., host cache service 307*b*) stored on a computer storage medium (storage medium 304*b*) that are executable by a processor (e.g., processor system 302*b*) to cause a destination host computer system (e.g., computer system 301*b*) to perform method 400*b*.

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

Figure 4:
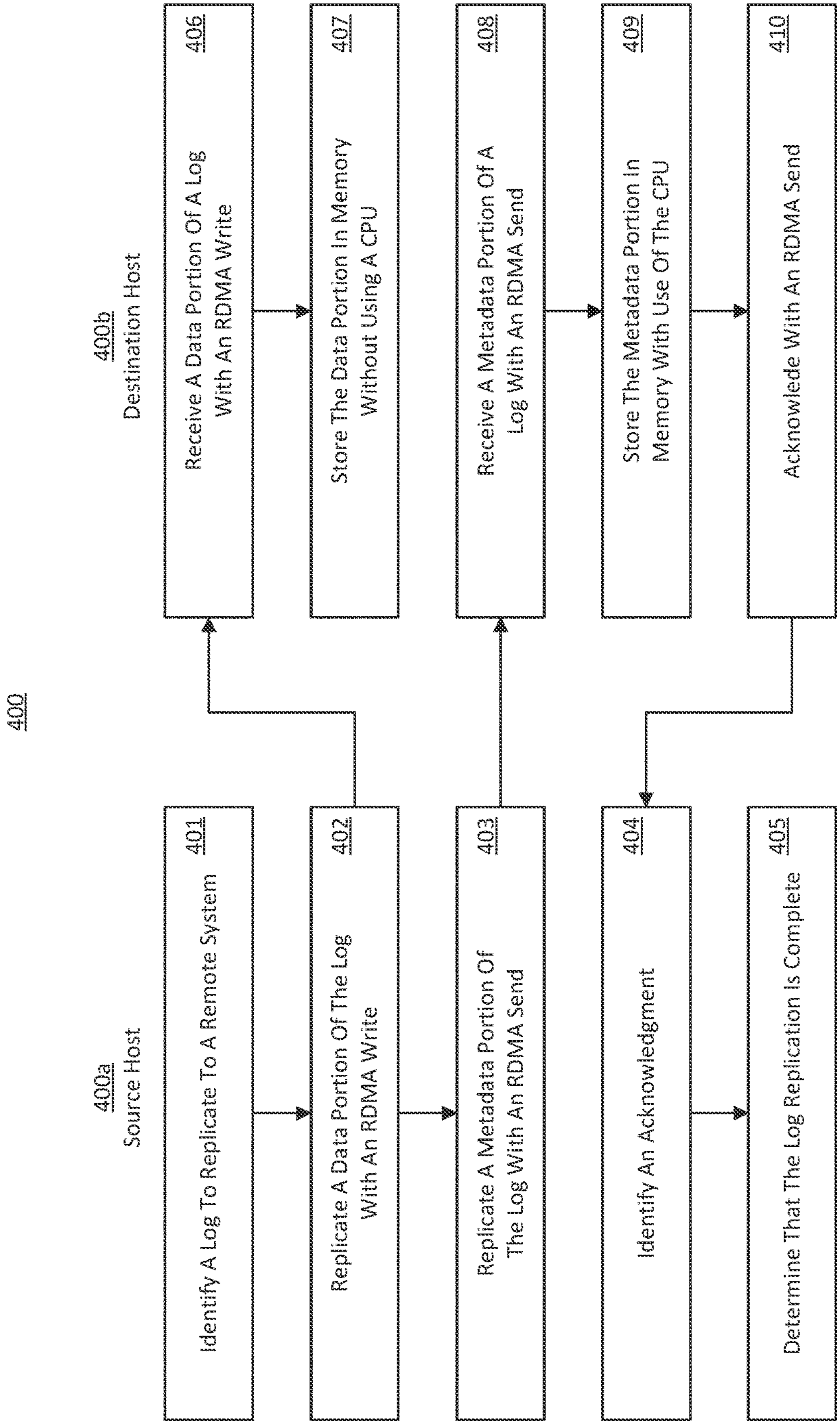
FIG. 4 illustrates a flow chart of an example of a method for using an RDMA replication model to replicate a log.

Referring to FIG. 4, from the perspective of a source host (e.g., host 101*a*), method 400*a* comprises act 401 of identifying a log to replicate to a remote system. In some embodiments, act 401 comprises identifying a log for replication to a remote computer system, the log comprising a data portion and a metadata portion. For example, log replication component 309*a* at computer system 301*a* identifies a log comprising data (e.g., entry 201*a* stored in data ring 311*a*) and metadata (e.g., entry 203*a* stored in metadata ring 312*a*) for replication to computer system 301*b*.

As noted in connection with examples 200 and 300, in embodiments, the data portion is stored in a first ring buffer (e.g., data ring 311*a*) within a memory, and the metadata portion is stored in a second ring buffer (e.g., metadata ring 312*a*) within the memory. In embodiments, the size of the data portion is a multiple of a size of a memory page in the computer system.

While method 400*a* is applicable within various contexts, in some embodiments, the log is stored in a write cache (e.g., write cache 112*a*) managed by a host cache service (e.g., cache service 109*a*). In some embodiments, the write cache is stored in PMem.

Method 400*a* also comprises act 402 of replicating a data portion of the log with an RDMA write. In some embodiments, act 402 comprises sending the data portion to the remote computer system using RDMA write operation. For example, log replication component 309*a* sends entry 201*a* to computer system 301*b* using an RDMA write operation 313. As discussed later in connection with act 407, this causes computer system 301*b* to store entry 201*a* into memory 303*b* (e.g., data ring 311*b*) without involving processor system 302*b*.

Method 400*b* also comprises act 403 of replicating a metadata portion of the log with an RDMA send. In some embodiments, act 403 comprises sending the metadata portion to the remote computer system using a first RDMA send operation after sending the data portion to the remote computer system using the RDMA write operation. For example, after sending entry 201*a* with an RDMA write, log replication component 309*a* sends entry 203*a* to computer system 301*b* using an RDMA send operation 314. As discussed later in connection with act 409, this causes computer system 301*b* to store entry 203*a* into memory 303*b* (e.g., metadata ring 312*b*) with the use of processor system 302*b*.

Method 400*a* also comprises act 404 of identifying an acknowledgment. In some embodiments, act 404 comprises identifying a second RDMA send operation received from the remote computer system, the second RDMA send operation signaling completion of the first RDMA send operation. For example, log replication component 309*a* identifies an RDMA send operation 315 received from computer system 301*b* as a result of computer system 301*b* processing the RDMA send operation 314 of act 403. In embodiments, the second RDMA send operation includes an indication of a status, such as a success status.

Method 400*a* also comprises act 405 of determining that the log replication is complete. In some embodiments, act 405 comprises determining the completion of replication of the log to the remote computer system based on identifying the second RDMA send operation. For example, based on identifying the RDMA send operation 315 in act 404, log replication component 309*a* determines that the log identified in act 401 has been successfully replicated to computer system 301*b*.

In some embodiments, method 400*a* is performed by host cache service 307*a* as part of supporting an I/O operation by host cache consumer 310*a*. In these embodiments, method 400*a* may also include identifying an I/O operation (e.g., an I/O operation initiated by host cache consumer 310*a*), generating the log from the I/O operation (e.g., by log management component 308*a*), and committing the I/O operation based on determining the completion of the replication of the log to the remote computer system (e.g., notifying host cache consumer 310*a* that the I/O operation is complete). In some embodiments, host cache consumer 310*a* is a virtual storage controller. In these embodiments, the I/O operation is identified from a virtual storage controller (e.g., a virtual NVMe controller), and committing the I/O operation includes notifying the virtual storage controller. In some embodiments, based on identifying the RDMA send operation, host cache service 307*a* de-stages the log to a backing store (e.g., backing store 118).

Turning to the perspective of a destination host (e.g., host 101*b*), method 400*b* comprises act 406 of receiving a data portion of a log with an RDMA write. In some embodiments, act 406 comprises receiving an RDMA write operation from a remote computer system, the RDMA write operation comprising a data portion of a log. For example, computer system 301_b_ receives RDMA write operation 313 initiated by computer system 301_a_ in act 402.

Method 400_b_ also comprises act 407 of storing the data portion in memory without using a CPU. In some embodiments, act 407 comprises storing the data portion of the log within memory without the use of a processor system. For example, because RDMA write operation 313 used an RDMA write operation 313, a PCIe bus at computer system 301_b_ writes entry 201_a_ to memory 303_b_ (e.g., data ring 311_b_) without use of processor system 302_b_.

Method 400_b_ also comprises act 408 of receiving a metadata portion of a log with an RDMA send. In some embodiments, act 408 comprises receiving the first RDMA send operation from the remote computer system, the first RDMA send operation comprising a metadata portion of the log. For example, computer system 301_b_ receives the RDMA send operation 314 initiated by computer system 301_a_ in act 403.

Method 400_b_ also comprises act 409 of storing the metadata portion in memory with the use of the CPU. In some embodiments, act 409 comprises storing the metadata portion of the log within memory with the use of the processor system. For example, because computer system 301_a_ used an RDMA send operation 314, processor system 302_b_ at host cache consumer 310_b_ writes entry 203_a_ to memory 303_b_ (e.g., metadata ring 312_b_).

Method 400_b_ also comprises act 410 of acknowledging with an RDMA send. In some embodiments, act 410 comprises sending a second RDMA send operation to the remote computer system after storing the metadata portion of the log in the memory. For example, log replication component 309_b_ at computer system 301_b_ initiates an RDMA send operation 315 to computer system 301_a_. In embodiments, the second RDMA send operation includes an indication of a status, such as a success status.

As noted in connection with examples 200 and 300, in embodiments, the data portion is stored in a first ring buffer (e.g., data ring 311_b_) within memory 303_b_, and the metadata portion is stored in a second ring buffer (e.g., metadata ring 312_b_) within the memory. In embodiments, the size of the data portion is a multiple of a size of a memory page in the computer system.

While method 400_b_ is applicable within various contexts, in some embodiments, the log is stored in a write cache (e.g., write cache 112_a_) managed by a host cache service (e.g., cache service 109_a_). In some embodiments, the write cache is stored in PMem.

Embodiments of the disclosure comprise or utilize a special-purpose or general-purpose computer system (e.g., computer system 301_a_, computer system 301_b_) that includes computer hardware, such as, for example, a processor system and system memory (e.g., memory 303_a_, memory 303_b_), as discussed in greater detail below. Embodiments within the scope of the present disclosure also include physical and other computer-readable media (e.g., storage medium 304_a_, storage medium 304_b_) for carrying or storing computer-executable instructions and/or data structures. Such computer-readable media can be any available media accessible by a general-purpose or special-purpose computer system. Computer-readable media that store computer-executable instructions and/or data structures are computer storage media. Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more CPUs, one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more VMs. During operation, VMs emulate an operational computing system, supporting an OS and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system, comprising:

identifying a log for replication to a remote computer system, the log comprising a data portion and a metadata portion;

sending the data portion to the remote computer system using a Remote Direct Memory Access (RDMA) write operation;

sending the metadata portion to the remote computer system using a first RDMA send operation, wherein;

the first RDMA send operation is issued after sending the data portion to the remote computer system using the RDMA write operation, and RDMA protocol ordering guarantees associated with the RDMA send operation ensure completion of the RDMA write operation upon processing of the first RDMA send operation at the remote computer system;

identifying a second RDMA send operation received from the remote computer system, the second RDMA send operation signaling completion of the first RDMA send operation; and determining a completion of replication of the log to the remote computer system based on identifying the second RDMA send operation, wherein the completion of replication is determined using the RDMA protocol ordering guarantees associated with the first RDMA send operation.

2. The method of claim 1, wherein the log is stored in a write cache managed by a host cache service.

3. The method of claim 2, wherein the write cache is stored in a persistent memory.

4. The method of claim 1, wherein the data portion is stored in a first ring buffer within a memory, and the metadata portion is stored in a second ring buffer within the memory.

5. The method of claim 1, wherein a size of the data portion is a multiple of a size of a memory page in the computer system.

6. The method of claim 1, wherein the method further comprises:

identifying an input/output (I/O) operation;

generating the log from the I/O operation; and committing the I/O operation based on determining the completion of the replication of the log to the remote computer system.

7. The method of claim 6, wherein, the I/O operation is identified from a virtual storage controller; and committing the I/O operation comprises notifying the virtual storage controller.

8. The method of claim 7, wherein the virtual storage controller is a virtual Non-Volatile Memory Express (NVMe) controller.

9. The method of claim 1, wherein the second RDMA send operation comprises an indication of a success status.

10. The method of claim 1, wherein the method further comprises de-staging the log to a backing store.

11. A method implemented in a computer system that includes a processor system, comprising:

receiving a Remote Direct Memory Access (RDMA) write operation from a remote computer system, the RDMA write operation comprising a data portion of a log;

storing the data portion of the log in a memory without use of the processor system;

receiving a first RDMA send operation from the remote computer system, wherein the first RDMA send operation is issued by the remote computer system after the RDMA write operation, and the first RDMA send operation comprises a metadata portion of the log;

storing the metadata portion of the log in the memory with use of the processor system, wherein RDMA protocol ordering guarantees associated with the first RDMA send operation ensure completion of the RDMA write operation upon processing of the first RDMA send operation at the computer system; and sending a second RDMA send operation to the remote computer system after storing the metadata portion of the log in the memory, wherein completion of replication of the log is determined by the remote computer system using the RDMA protocol ordering guarantees associated with the first RDMA send operation.

12. The method of claim 11, wherein the data portion of the log and the metadata portion of the log are stored in a write cache managed by a host cache service.

13. The method of claim 12, wherein the write cache is stored in a persistent memory.

14. The method of claim 11, wherein the data portion is stored in a first ring buffer within the memory, and the metadata portion is stored in a second ring buffer within the memory.

15. The method of claim 11, wherein a size of the data portion is a multiple of a size of a memory page in the computer system.

16. The method of claim 11, wherein the second RDMA send operation comprises an indication of a success status.

17. A computer system, comprising:

a processor system; and a computer storage medium that stores computer-executable instructions that are executable by the processor system to at least:

identify a log for replication to a remote computer system, the log comprising a data portion and a metadata portion;

send the data portion to the remote computer system using a Remote Direct Memory Access (RDMA) write operation;

send the metadata portion to the remote computer system using a first RDMA send operation, wherein:

the first RDMA send operation is issued after sending the data portion to the remote computer system using the RDMA write operation, and RDMA protocol ordering guarantees associated with the RDMA send operation ensure completion of the RDMA write operation upon processing of the first RDMA send operation at the remote computer system;

identify a second RDMA send operation received from the remote computer system, the second RDMA send operation signaling completion of the first RDMA send operation; and de-stage the log to a backing store based on identifying the second RDMA send operation, wherein the de-staging is performed based on determining that replication of the log to the remote computer system has completed, the determining being based on the RDMA protocol ordering guarantees associated with the first RDMA send operation and on identifying the second RDMA send operation.

18. The computer system of claim 17, wherein the data portion is stored in a first ring buffer within a memory, and the metadata portion is stored in a second ring buffer within the memory.

19. The computer system of claim 17, wherein a size of the data portion is a multiple of a size of a memory page in the computer system.

20. The computer system of claim 17, wherein the computer-executable instructions are also executable by the processor system to at least:

identify an input/output (I/O) operation;

generate the log from the I/O operation; and commit the I/O operation based on identifying the second RDMA send operation.

* * * * *